UNITED STATES PATENT OFFICE.

HENRY V. DUNHAM, OF BELLOWS FALLS, VERMONT, ASSIGNOR TO CASEIN COMPANY OF AMERICA, A CORPORATION OF NEW JERSEY.

CASEIN SOLUTION AND METHOD OF PRODUCING SAME.

No. 821,620.      Specification of Letters Patent.      Patented May 29, 1906.

Application filed January 27, 1905. Serial No. 242,983.

*To all whom it may concern:*

Be it known that I, HENRY V. DUNHAM, a citizen of the United States, residing at Bellows Falls, in the county of Windham and State of Vermont, have invented or discovered certain new and useful Improvements in Casein Solutions and Methods of Producing the Same, of which the following is a specification.

This invention or discovery has for its object to produce an insoluble casein product by the aid of an alkaline hydrate, alcohol, and formaldehyde, such product being suitable for use in photographic films or for other purposes, as for tablets, &c.

While I am aware that formaldehyde has heretofore been used in connection with alkalized water-casein solutions, yet, to my knowledge, no process has ever been discovered for the use of formaldehyde in alcoholic-casein solutions for the purpose of rendering the product insoluble. I have, however, discovered that by dissolving casein with alcohol by the aid of an alkaline hydrate soluble in alcohol I am able to produce an alcoholic solution of casein the dried product of which will be waterproof or insoluble in water if the solution has been rendered neutral.

The invention or discovery is carried into effect by dissolving about one hundred parts of casein in a mixture of from two hundred to three hundred parts of methyl or ethyl alcohol and about fifteen to twenty parts of an alkaline hydrate soluble in alcohol, preferably potassium hydrate or sodium hydrate, the casein being completely dissolved by the combined action of the alcohol and either of these hydrates when the mixture is allowed to stand or is gently agitated for a suitable time, such solution of the casein being effected without the aid of heat. I then preferably add to this alcoholic-casein solution from ten to twenty parts of a concentrated formaldehyde, and the resulting material may then be formed into films by spreading the solution on cloth, paper, or glass and allowing it to dry, such films being insoluble in water. The formaldehyde used may either be in solution or in the form of a gas which is passed into the alcoholic-casein solution.

The alcoholic-casein solution just described may be neutralized by means of any suitable acid or acid salt and without precipitating the casein, and after such neutralization the formaldehyde when used is added to the solution, producing the insoluble results just stated. In thus neutralizing the alcoholic-casein solution with an acid or acid salt care should be taken not to render the solution decidedly acid, as in such case the formaldehyde will not render the dried-out product waterproof or insoluble.

Having thus described my invention or discovery, I claim and desire to secure by Letters Patent—

1. The herein-described casein solution comprising casein, alcohol, an alkaline hydrate soluble in alcohol, and formaldehyde.

2. The herein-described method of producing a casein solution which, when dried out, will be waterproof or insoluble in water, consisting in dissolving casein in a mixture of alcohol and an alkaline hydrate soluble in alcohol, neutralizing the mixture, and then adding formaldehyde to the solution.

In testimony whereof I affix my signature in presence of two witnesses.

HENRY V. DUNHAM.

Witnesses:
    LOUIS H. SMITH,
    MARCUS ALLEN.